May 28, 1968 E. BLANK 3,386,057
THREE-POSITION ELECTROMAGNETICALLY OPERATED SWITCH
Filed Feb. 5, 1965 2 Sheets-Sheet 1
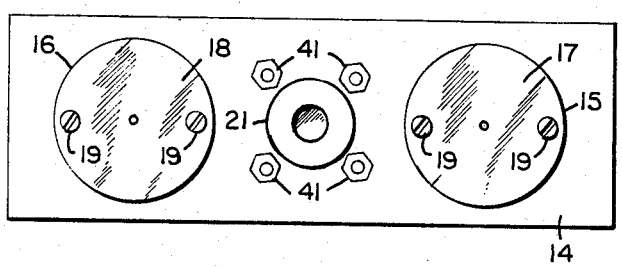
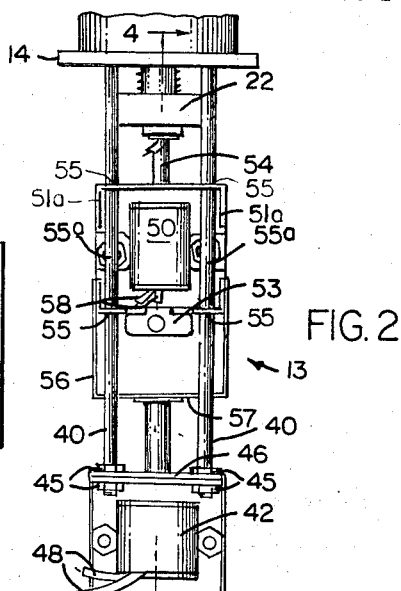
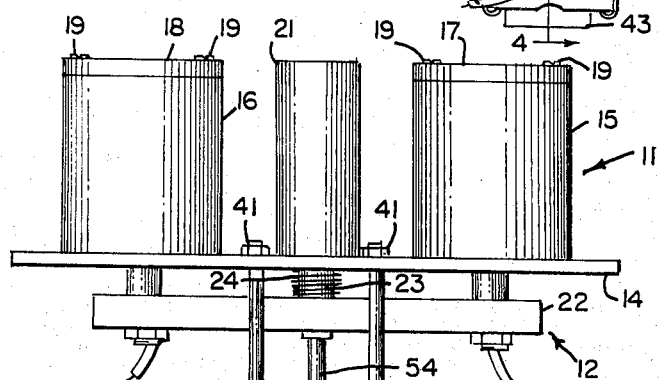
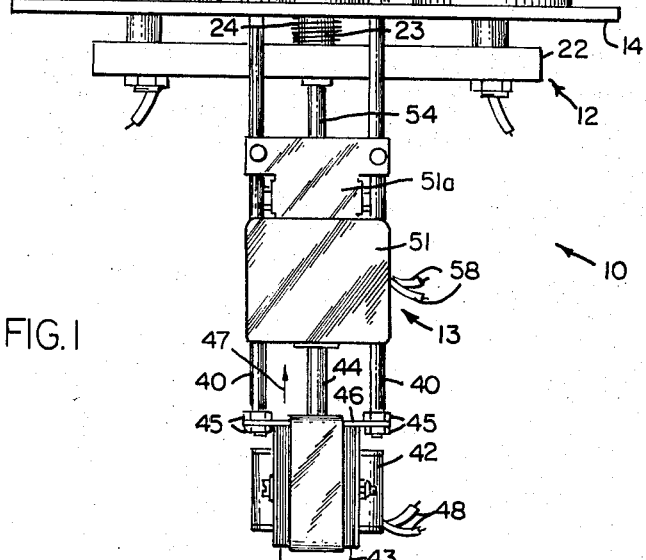
INVENTOR
EDWARD BLANK
ATTORNEYS May 28, 1968 E. BLANK 3,386,057
THREE-POSITION ELECTROMAGNETICALLY OPERATED SWITCH
Filed Feb. 5, 1965 2 Sheets-Sheet 2

INVENTOR
EDWARD BLANK
BY,
Wolf, Greenfield & Hieken
ATTORNEYS

United States Patent Office 3,386,057
Patented May 28, 1968

3,386,057
THREE-POSITION ELECTROMAGNETICALLY
OPERATED SWITCH
Edward Blank, Sharon, Mass., assignor to Tobe Deutschmann Laboratories, Inc., Canton, Mass., a corporation of Massachusetts
Filed Feb. 5, 1965, Ser. No. 430,552
13 Claims. (Cl. 335—177)

The present invention relates to a switching means and more particularly to a novel and improved electrical switching means particularly useful in connection with a bank of capacitors, which permits charging of the capacitors, use of the charged capacitors while isolated from ground and power sources, and emergency discharge of the capacitors under preselected conditions.

There are many applications where a bank of capacitors is used for high voltage work such as in the plasma physics field. In such applications, high voltages are used often in the nature of 20 kilovolts and above. A common problem in the use of capacitor banks has been the problem of properly and inexpensively isolating the bank from both the power source and ground. Often such isolation is neglected because of inadequate means for effecting such isolation. This may result in several problems. For example, during discharge voltage reversals are created in the system containing the bank which in turn will raise ground potential with the consequent possibilities of damaging nearby equipment and injuring people. In addition, the parallel ground loops that are created may cause transient electric and magnetic fields which interfere with sensitive instruments normally used with capacitor banks. In some cases as many as six relays are employed with large banks of capacitors to perform the function of a two-channel switch and at least in part overcome the problems recited above.

An important object of this invention is to provide an efficient and relatively inexpensive high voltage switching means which provides three switching positions including a neutral position for isolating a capacitor bank or other circuit from ground and power sources.

Another object of this invention is to provide a switching means in accordance with the preceding object having an emergency ground position for discharging a bank of capacitors with minimized risk, and being automatically actuated to a dump position upon occurrence of a power failure.

Still another object of this invention is to provide a relay means in accordance with the preceding object which provides for charging, isolating while utilizing, and equalizing both the charged and ground terminals of a bank of capacitors.

According to the invention, a switching means has at least one electrical contact constructed and arranged to selectively move into a first, a second and a third position. A floating support mounts the contacts with an electrical actuating means operatively aligned with the support for causing a first movement of the support. A second electrical actuating means is operatively aligned with the first actuating means for moving both the floating support and the first actuating means. Preferably the switching means is a relay having the floating support and actuating means in vertical alignment so that a power failure to the actuating means automatically gravity drops both the floating support and the contacts into a safety position.

In the preferred embodiment of this invention a relay is provided for connection with a bank of capacitors. The relay has a first charging position for charging the bank, a second neutral position permitting electrical isolation and utilization of the charged bank for high voltage applications and a third position acting as an emergency discharge by interconnecting hot and ground plates of the bank to discharge the bank on power failure to the relay or other selected conditions and to keep the bank shorted when not in use. The relay has a ground plate with first and second spaced charging terminals positioned on one side of the plate. A supporting yoke is mounted on a second side of the ground plate for reciprocal sliding movement towards and away from the plate. First and second contacts are mounted on the yoke for selective movement therewith into the first position with the contacts touching the terminals, the second position with the contacts spaced between the terminals and the ground plate and the third position with the contacts touching the ground plate and dumping the bank. A first solenoid cooperates with the first solenoid for moving the yoke into the first position. Preferably the solenoids are vertically arranged so that upon cut off of a power supply to the solenoids, the yoke is gravity dropped into the third position dumping the bank.

These and other features, objects and advantages of the invention will be better understood and appreciated from the following detailed description of one embodiment thereof selected for purposes of illustration and shown in the accompanying drawings in which:

FIG. 1 is a front view of a preferred embodiment of a relay switching means in accordance with this invention;

FIG. 2 is a side view thereof;

FIG. 3 is a top view thereof;

Figure 6:
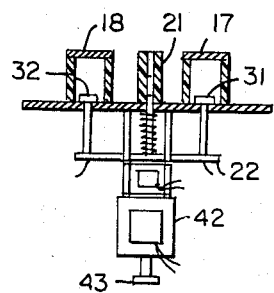
FIG. 6 is a semidiagrammatic view partially in cross section showing a third position of the relay of this invention.

With reference now to the drawings, a high voltage relay is indicated generally at 10 in FIG. 1 having a terminal assembly 11, a yoke assembly 12 and an actuating means assembly 13. The terminal assembly 11 has a flat rectangular ground plate 14 preferably formed of brass or other good conductive material. Preferably insulating cylinders 15 and 16 are symmetrically mounted on the plate 14 by conventional means. The insulating cylinders 15 and 16 may be formed of any conventional high quality arc resistant insulating material such as laminated resin impregnated cloth or plastic. Two contact terminals preferably in the form of discs 17 and 18 of conductive material such as brass are attached to the top of the cylinders 15 and 16 respectively, preferably parallel to the conductive ground plate 14 by means of screws 19 or other conventional means.

The upper side of the ground plate 14 also carries a hollow cylinder 21 fixed to the plate 14 which acts as a guide for the yoke assembly as will be discussed hereinafter.

Figure 4:
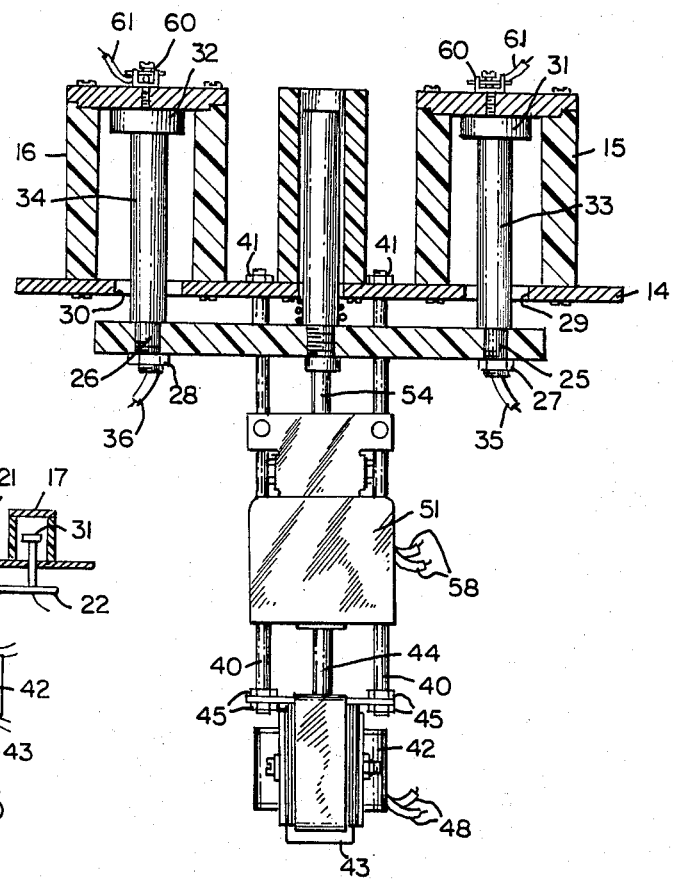
FIG. 4 is a cross sectional view taken through line 4—4 of FIG. 2.

The yoke assembly 12 is made up of a yoke 22 or floating support which is preferably a flat insulating plate substantially parallel to the ground plate 14 on the lower side thereof. The yoke carries a fixed guide rod 23 preferably formed of an insulating material which is slidably received in the cylindrical guide 21. Preferably a coil spring 24 surrounds the guide bar 23 and is in compression thus normally biasing the yoke 22 downwardly. The spring 24 is preferably fixed at its ends to the ground plate 14 and the yoke 22. The yoke 22 is guided by rod 23 in conjunction with guide rods 40 as best seen in FIG. 2. Insulating hollow rods 25 and 26 are preferably normal to the yoke and affixed thereto by bolts 27 and 28 respectively. The insulating shafts 25 and 26 extend upwardly through apertures 29 and 30 respectively in the ground plate 14 to contacts which are preferably contact buttons 31 and 32 respectively. Preferably cylindrical increased diameter portions 33 and 34 are provided on shafts 25 and 26 which provide for positive arc resistant insulation between the contacts 31 and 32 and the ground plate 29. The diameters of contact buttons 31 and 32 are preferably larger than the diameters of apertures 29 and 30 respectively so that when the yoke is in its lowermost position, electrical contact is made between the contact buttons and the underside of the ground plate. The diameters of the contact buttons are smaller than the diameters of cylinders 15 and 16 to prevent arcing over inner surfaces of the cylinders during emergency discharge of a bank. Electrical conductors are connected to each of the contact buttons 31 and 32 and preferably comprise insulated high voltage lines 35 and 36 each respectively connected to positive and negative terminals of a bank of capacitors. It should be understood that the yoke 25 is capable of moving from its position shown in FIG. 4, downwardly to an intermediate position where the contact buttons lie intermediate terminals 17 and 18 and the conductive ground plate and further to a lowermost position where the contact buttons 31 and 32 are electrically connected with the ground plate 14.

The actuating means assembly preferably comprises a pair of transducers and is preferably mounted upon four guide rods 40 defining corners of a rectangle on the guide plate 14. The guide rods 40 are affixed to the ground plate by bolts 41.

Figure 5A:
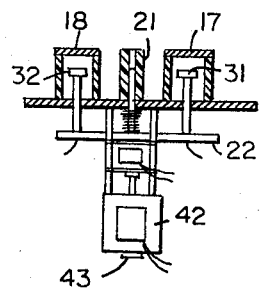
FIG. 5a is a semidiagrammatic view partially in cross section showing a second position of the relay of this invention.
Figure 5:
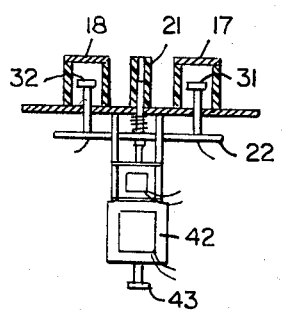
FIG. 5 is a semidiagrammatic view partially in cross section showing a first position of a relay in accordance with this invention.

A pusher solenoid 42 is fixed to the ends of guide bars 40 by threaded bolts 45 on a mounting plate 46 of the solenoid. The solenoids used in the relay 10 can be conventional solenoids such as 110 volt 60 cycle A.C. pusher solenoids. The solenoid 42 has a weighted armature 43 fixed to a reciprocal plunger 44 which can be urged upwardly in the direction of arrow 47 and returns to its position as shown in FIG. 5 when the solenoid is deenergized by a gravity pull on the armature 43. Leads 48 of the solenoid 42 are connected to a power supply for actuation at selected time intervals.

A second solenoid 50 preferably substantially identical to solenoid 42 is slidably mounted on the guide rods 40 by a generally U shaped metallic housing 51. Solenoid 50 also carries a weighted armature 53 with an attached vertically reciprocal plunger 54. The housing 51 is affixed to the solenoid 50 on side mounting plate 51a and has tabs with aligned holes 55 therein for sliding of the entire solenoid unit on the guide rods 40. The lower portion 56 of the housing 51 allows sufficient room for the weighted armature 53 to be withdrawn as shown in FIGS. 5a and 6 and provides a back wall 57 which may be urged upward by plunger 44 of solenoid 42 at preselected times. Leads 58 of the solenoid 50 are suitably connected to a power supply (not shown), for actuating of plunger 54. Tabs 55a provide for mounting of solenoid 50 in fixed position with respect to housing 51.

Preferably screw contacts such as 60 (FIG. 4) are employed to attach leads 61 of opposed polarity for charging a bank of capacitors in use of the switching means of this invention. The screws 60 are threadably engaged with the terminal discs 17 and 18 in a conventional manner.

A casing may be provided covering the unit for mounting in the position shown in FIG. 1. Alternately the ground plate 14 can be mounted on a suitable support and have ground connections attached thereto if desired.

The operation of the relay of this invention to charge, disconnect and dump, positive and negative plates of a bank of capacitors is extremely simple. In a first position of the relay shown in FIG. 4, solenoids 50 and 42 are actuated with plungers 54 and 44 extending to their highest vertical position, thus urging the yoke 22 against the force of spring 24 and placing contact buttons 31 and 32 in face to face contact touching terminals 17 and 18 respectively. In this position, positive and ground plates of a bank of capacitors attached to lines 35 and 36 respectively are directly connected with positive and negative lines 60 and 61 respectively of a power supply so that the capacitor bank is charged. After charging, plunger 54 is returned to its lowermost position as shown in FIG. 5a by cutting off the power supply to solenoid 50 leaving the solenoids in the position shown in FIG. 5a and allowing the yoke to assume a neutral halfway position with contact buttons 31 and 32 approximately halfway between terminals 17 and 18 respectively and ground plate 14. In this neutral position of the relay, as best shown in FIG. 5 or 5a, the bank of capacitors may be employed for testing, plasma work or any other conventional application.

Cut off of the power supply to solenoid 42 allows the force of gravity to pull plunger 44 to its lowermost position as shown in FIG. 6 allowing gravity to drop the entire solenoid 50 and its housing 51 to its lowermost position as shown in FIG. 6 and consequently drop yoke 22 to its lowermost position. In this position of the yoke contacts 31 and 32 simultaneously contact ground plate 14 to dump the capacitors in the bank. It should be understood that the capacitors are discharged by neutralization of the charged and ground plates thereof without the need for an external ground system.

The relay of this invention can operate as a safety emergency device for dumping the capacitor bank. Upon any extreme conditions, solenoids 50 and 42 can be disconnected thereby dumping the bank. In addition, should an emergency occur cutting off the power to the solenoids, the capacitor bank is immediately dumped.

In FIG. 5 there is illustrated an alternate means of operating the solenoids 50 and 42 whereby the intermediate position of the contacts to place them in a neutral location can be brought about by deactuation of solenoid 42 while solenoid 50 still has its plunger extended upwardly. This operation achieves the same result in that the yoke is lowered to its half way position and the contact buttons 31 and 32 are removed from both the terminal discs 17 and 18 and the ground plate 14. It should be understood that the sequence of positions of the contacts 17 and 18 may vary depending upon particular usage of the relay 10.

While the specific embodiment of this invention has been shown and described, it should be understood that many variations thereof are possible. For example, while the device is preferably symmetrical, asymmetrical configuration may be employed. Similarly, although a double pole, double throw, neutral center relay has been described, it is possible to use a triple pole or four pole relay if desired. Similarly, any desired number of contacts can be used in particular applications.

The specific sliding mechanism and guideways for the yoke and solenoid can be varied in accordance with conventional practices. While a vertical arrangement is desirable to utilize the force of gravity in dropping solenoid 50, its housing assembly, the plungers, and the yoke 22, suitable spring returns can be used in some applications. In some cases it may be desirable to utilize air cylinders in place of solenoids 50, 42 or the two solenoids can be replaced by a two position solenoid in an alternate modification.

In view of the many modifications and variations of this invention which will be apparent to one skilled in the art, this invention is to be limited only by the spirit and scope of the appended claims.

What is claimed is:

1. In combination with an electrical relay construction comprising an electrical contact constructed and arranged to selectively move into a first, second and third position, the improvement comprising, a floating support mounting said contact, a first actuating means operatively aligned with said support for causing a first movement thereof, a second actuating means operatively aligned with said first actuating means for moving both said support and said first actuating means when said first actuating means is actuated.

2. The improvement of claim 1 wherein said floating support, said first actuating means and said second actuating means are vertically aligned so that the deactuation of said first actuating means causes a gravity drop of said support and deactuating of said second actuating means causes a further gravity drop of said support.

3. A switching means for use in charging and discharging a bank of capacitors, said switching means having a first charging position, a second neutral position and a third discharging position, said switching means comprising,
 a ground plate,
 first and second spaced charging terminals positioned on a first side of said ground plate,
 a yoke mounted on a second side of said ground plate for reciprocal movement towards and away from said plate,
 first and second contacts fixed to said yoke for selective movement therewith into said first position with said contacts touching said terminals, said second position with said contacts spaced between said terminals and said plate, and said third position with said contacts touching said plate,
 first actuating means for moving said yoke into said second position,
 second actuating means cooperating with said first mentioned means for moving said yoke to said first position,
 said first and second actuating means being constructed and arranged to permit gravity dropping of said yoke into said third position upon deactuation of said first and second means.

4. A switching means in accordance with the switching means of claim 3 wherein said first and second actuating means comprise first and second solenoids aligned with each other,
 one of said solenoids being fixed with respect to said plate and the other of said solenoids being mounted for sliding reciprocal movement between said plate and said one fixed solenoid.

5. A relay for use in connecting positive and negative plates of a bank of capacitors, said relay comprising,
 a ground plate,
 first and second spaced charging terminal discs positioned on a first side of said plate and insulated therefrom by first and second insulating members,
 a yoke slidably mounted on a second side of said plate for reciprocal movement towards and away from said plate,
 first and second contacts extending from said yoke through said plate and insulated from one another,
 aligned first and second electrical transducers for actuating said yoke to move said contacts,
 said first transducer being fixed with respect to said plate and said second transducer floating between said plate and said first transducer for cooperating with said first transducer for selective positioning of said relay.

6. A neutral position electrical relay comprising,
 a conductive ground plate defining first and second spaced apertures,
 first and second flat spaced terminals positioned parallel to and above said plate,
 a yoke positioned below said plate,
 a spring means urging said yoke away from said plate,
 first and second spaced rods mounted on said yoke and extending through said first and second spaced apertures respectively,
 first and second contacts mounted on said rods,
 and transducer means for moving said yoke from a position where said contacts simultaneously engage said ground plate, to a position where said contacts are insulated from said ground plate and said terminals, and a position where said contacts engage said terminals.

7. A relay in accordance with claim 6 wherein said yoke moves to said positions along a linear path towards said plate.

8. A relay in accordance with claim 6 wherein said transducer means comprises first and second aligned transducers each carrying a vertically reciprocal pusher.

9. A relay in accordance with claim 6 wherein said transducer means comprises a first and second solenoid,
 said first solenoid being mounted in fixed position with respect to said ground plate,
 said second solenoid being mounted on a movable housing for movement towards and away from said ground plate upon coresponding movement of a reciprocal pusher of said first solenoid.

10. A relay in accordance with claim 9 wherein said first and second terminals are connected to positive and negative lines respectively of a power source,
 and said first and second contacts are adapted to be connected to positive and negative plates of a bank of capacitors respectively.

11. A relay in accordance with claim 6 wherein said yoke comprises a guide rod passing through an alignment means mounted on said ground plate for guiding said yoke during movement towards and away from said ground plate.

12. A high voltage relay comprising a pair of spaced terminals,
 a conductive plate spaced from said terminals,
 a pair of contacts mounted between said pair of terminals and said conductive plate,
 means for reciprocating said pair of contacts into a position contacting said terminals and a second position spaced from said terminals to electrically isolate said terminals from ground and power sources.

13. A high voltage relay for use with a capacitor bank, said relay comprising a pair of spaced charging terminals,
 means for grounding said terminals spaced from said pair of terminals,
 a pair of contacts mounted for movement between said pair of terminals and said grounding means,
 and means for moving said pair of contacts into a first position contacting said terminals permitting charging of a capacitor bank, a second position spaced from said pair of terminals and said grounding means to electrically isolate said terminals from ground and power sources, and a third position contacting said grounding means for discharge through said grounding means.

References Cited
UNITED STATES PATENTS 2,693,510 11/1954 Luebking et al. _____ 317—12 X
2,919,324 12/1959 Schuessler _____ 335—180 X BERNARD A. GILHEANY, *Primary Examiner.*

R. N. ENVALL, JR., *Assistant Examiner.*